2 Sheets—Sheet 1.
J. J. CURRAN,
Assignor of one-third Interest to C. WILCOX.
Lumber-Drier.
No. 8,840. Reissued Aug. 12, 1879.
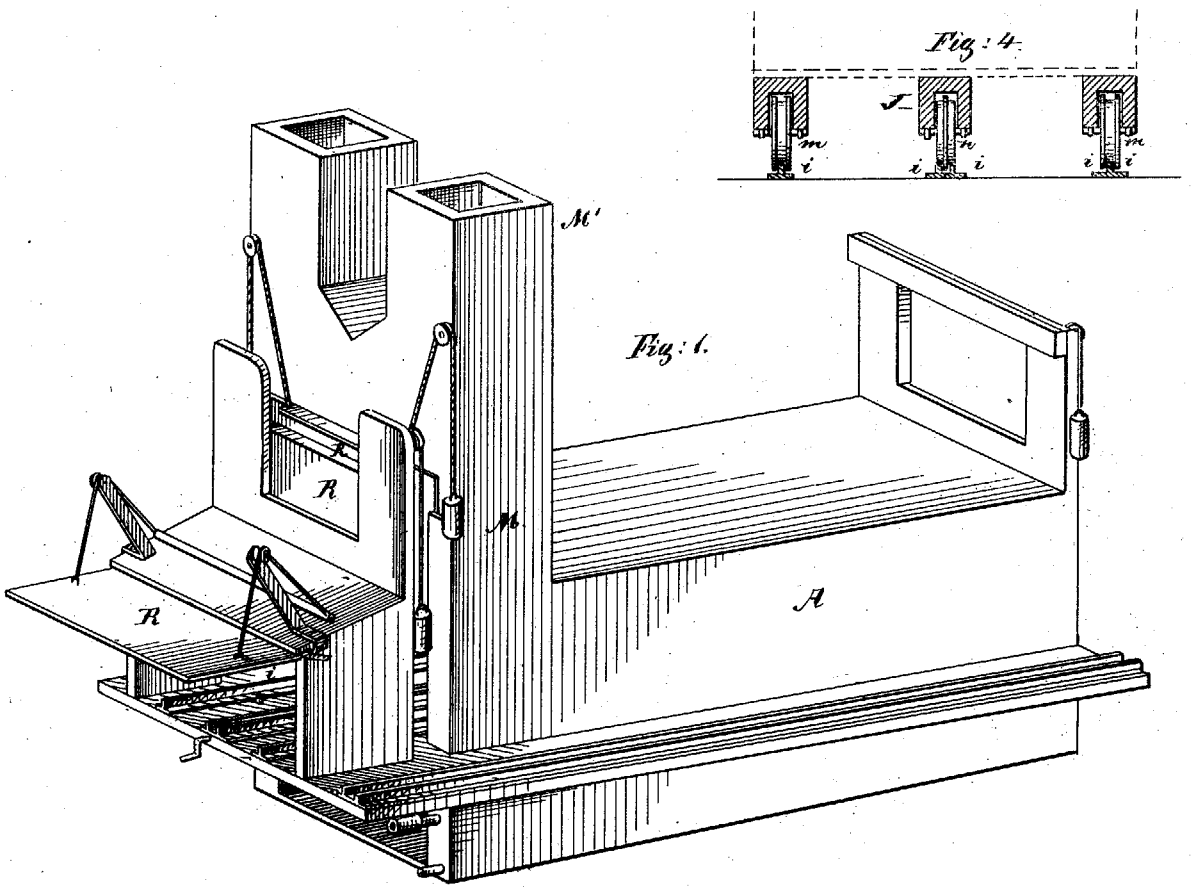
WITNESSES
Emil H. Frommann
F. A. Merrill
INVENTOR
John J. Curran
per W. E. Dayton
Attorney J. J. CURRAN,
Assignor of one-third Interest to C. WILCOX.
Lumber-Drier.
No. 8,840. Reissued Aug. 12, 1879.
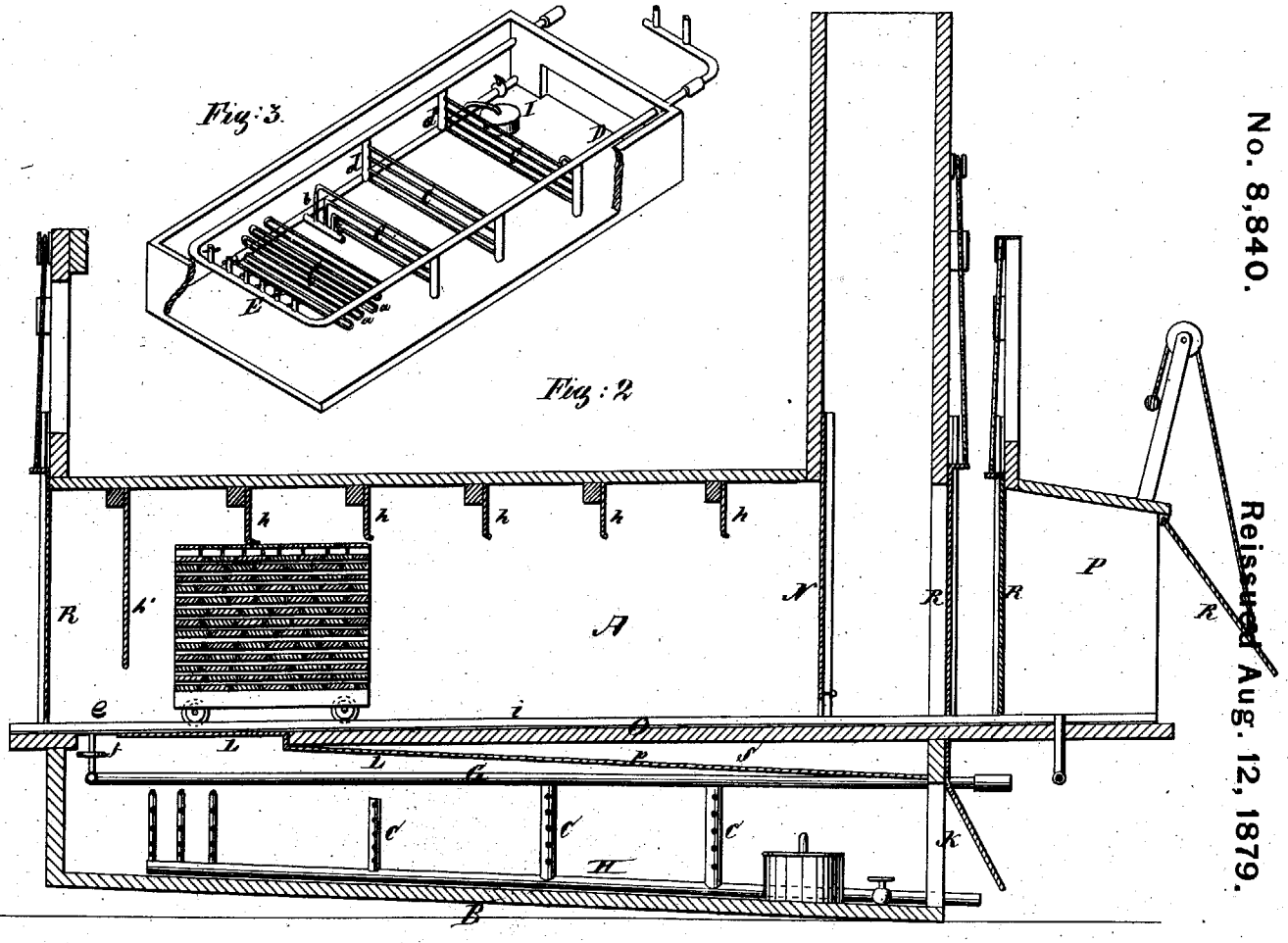
WITNESSES
Emil H. Frommann
F. A. Merrill
INVENTOR
John J. Curran
per Ul. E. Dayton
Attorney

UNITED STATES PATENT OFFICE.

JOHN J. CURRAN, OF CHICAGO, ILLINOIS, ASSIGNOR OF ONE-THIRD INTEREST TO CARLOS WILCOX.

IMPROVEMENT IN LUMBER-DRIERS.

Specification forming part of Letters Patent No. 189,432, dated April 10, 1877; Reissue No. 8,840, dated August 12, 1879; application filed July 2, 1879.

*To all whom it may concern:*

Be it known that I, JOHN J. CURRAN, of Chicago, in the county of Cook, and in the State of Illinois, have invented certain new and useful Improvements in Lumber-Driers; and declare that the following is a full, clear, and exact description thereof, reference being had to the accompanying drawings, and to the letters of reference marked thereon, making a part of this specification.

The nature of my invention consists in certain improvements upon the lumber-drier for which Letters Patent No. 161,490 were granted to me March 30, 1875, as will be hereinafter more fully set forth.

In order to enable others skilled in the art to which my invention appertains to make and use the same, I will now proceed to describe its construction and operation, referring to the annexed drawings, in which—

Figure 1 is a perspective view of a lumber-drier embodying my improvements. Fig. 2 is a longitudinal vertical section of the same. Fig. 3 is a perspective view of the heating-chamber. Fig. 4 shows the construction of the lumber-cars.

A represents the shell or body of the kiln, and may be constructed of brick, lumber, or other materials, and in any suitable and convenient size, shape, and manner desired. The walls should be filled and packed with sawdust, to better retain the heat and resist the cold.

The ground-floor B, upon which the heating apparatus is placed, is usually made of lumber, with sawdust carefully packed underneath, to better protect the heating-chamber from dampness and cold. It may, however, be made of any other suitable material, and it should have an inclination or fall from the rear end to the front of about one foot in forty, to give a downward flow to the steam and condensation in the heating-pipes, and at the same time an upward tendency to the current of air passing in the opposite direction as it becomes rarefied and heated in passing through between and in contact with the steam-pipes C C, which are arranged in gate form or like a series of gates or bars across the kiln, as shown in Fig. 3.

The heating apparatus consists of the feed-pipe D, the cross-header E, the supply-header G, usually made of four or five inch steam-pipe, the exhaust-header H, usually made of three or four inch steam-pipe, and the gates or coils of steam-pipe C, usually made of one-inch pipe, nine or eleven pipes high, or any number desired.

The pipes C C may be made up with return bends *a* or with cast-iron branch T's or L's *b*, to allow expansion and contraction; or they may be made up straight, with suitable expansion-joints *d*, the last two forms of coils being connected both with the supply and exhaust headers by means of right and left nipples.

At the end of the exhaust-headers H is attached a steam-trap, I, the purpose and operation of which are to hold and save the steam in the pipes when live steam is being used, but which drains off and discharges the water therefrom as fast as the steam is condensed, thereby saving, accumulating, and increasing the heat.

In the cross-header E are inserted a number of steam-jets, *e e*, and the pipes C, forming the gates or coils, are arranged across the kiln in such a manner as to allow free expansion and contraction of the pipes, and to force the air while being heated to pass directly through the series of gates or coils.

By this peculiar arrangement of the heating apparatus the cold air which enters at the inlet K passes freely through the heating-chamber on an ascending or rising grade, freely circulating through, between, and in contact with the pipes, becoming more and more heated and rarefied as it advances, and finally rises with considerable velocity and force through the hot-air opening *f*.

The steam-jets *e* in the cross-header E are usually about one-half inch in size, provided each with a pet-cock to regulate the flow of steam. The flow of steam at this point insures a strong and steady draft, while the steam mingles rapidly with the hot air, softening its effect upon the lumber, moistening the surface, and preventing a too rapid drying and shrinking of the same.

By this device I have effectually overcome the difficulty in lumber-seasoning so universally complained of—namely, the warping, checking, case-hardening, and burning of the lumber, as well as also the loosening of the knots.

The hot air, mingled with the steam flowing from the jets *e*, is drawn forward evenly and uniformly through the drying-chamber, passing through the lumber, which is piled upon the cars J, with ratlines at both ends and in the middle, directly over the three trucks, so as to have a firm support and hold the lumber flat, straight, and even in its place, which also tends to prevent warping and checking at the ends—a defect so much complained of by lumber merchants.

The cars J consist of simple and independent trucks, without braces or sides to obstruct the current of hot air, which is allowed to pass freely under the cars of lumber, so that the bottom courses are as thoroughly dried as the top. L is the sheet-iron floor at the rear end of the kiln, which floor also radiates heat from below to the under side of the lumber, thus preventing the cold and damp air from settling and remaining in the bottom of the kiln.

I also place curtains *h h*, of canvas or equivalent material, at intervals along the ceiling of the drying-chamber, to hang loosely down about eighteen inches, to rest upon the top of the cars of lumber, thus preventing the hot air from rushing along the ceiling, and forcing it downward to pass through the lumber and under the same.

At the front end of the kiln, from the inside base of the chimney M, is suspended a strong canvas curtain, N, or a sliding door of thin lumber may be used, clear across the kiln, and down to within eighteen inches of the floor, which has the effect of lengthening the chimney and increasing the draft, and, at the same time, operates to draw out the coldest and dampest portion of the air settling to the bottom of the kiln.

The chimney M is constructed at the base the whole width of the kiln, starting at the front end from the ceiling, and raised about twenty feet, more or less, above the roof. It is then divided or swallow-tailed at an angle of about forty-five degrees from the center toward the outer extremities, and finished out with chimneys M′ M′, in the form of squares or parallelograms, carried up some twenty feet higher, or any distance desired.

By this device I insure a strong and even draft clear across the kiln, the depending curtain or sliding door N serving, in connection with the chimney opening higher than its lower margin, to deflect and sharply bend the air-current, and thus to spread the same into a broad even stream as it escapes beneath the curtain, notwithstanding the current is afterward divided by the chimney above.

The floor O of the drying-chamber is also inclined, and extends a suitable distance beyond the ends of the kiln, to form the loading and unloading platforms, and is provided with the sheet-iron part L, as above described, and also the hot-air openings or registers *f*, to admit hot air from the heating-chamber below into the drying room.

Upon the platform in front of the kiln is constructed a steam-box or room, P, of sufficient capacity and dimensions to admit a car of lumber, for the purpose of steaming the same before it enters the drying-room. Steam may be introduced into this apartment in any manner found most economical and convenient.

The iron rails or tracks *i i* pass through the steaming-apartment, so that the cars of lumber may be run into it, and from thence into the drying-room.

Sliding doors R, suitably counterbalanced, are arranged for the steaming-apartment and dry-chamber, to allow the cars of lumber to pass into and through the same.

There are three rails or tracks, *i*, used in my kiln, and the cars are simple and independent trucks, without sides or braces to obstruct the circulation.

Each truck is provided with two double-flanged wheels, *m*, to run over a single T-rail, or two center-flanged wheels, *n*, to run on two rails close together, with the center flange running between the rails. Two, three, or more of these trucks may be used to form one car; but in all cases such trucks should be entirely disconnected from each other.

While the lumber is being treated in the steam-chamber P the sap is killed, the albumen cooked, and the lumber softened and its pores opened, so that the heat may readily penetrate the lumber and first dry out the center, thus improving the quality of the lumber and facilitating the seasoning process.

A dead-air chamber, S, extends from the sheet-iron floor L to the front or cold end of the kiln, and is formed underneath the dry-room floor O by means of a tight ceiling, *p*, constructed over the heating-pipes, close to them, and parallel to the ground-floor B, thus cutting off the useless space usually found in other kilns of similar construction between the pipes and the dry-room floor at the cold end, which would remain filled with eddies of cold and foul air, and allow much of the same to pass through into the kiln without coming in contact with the pipes and being properly heated. By this device the cold air entering at K sweeps directly through the heating-chamber, coming in direct contact with the steam-pipes, and becoming thoroughly and uniformly rarefied and heated before it passes through the opening *f* into the drying-room.

The curtain or sliding door N at the front end of the kiln, and extending down, as described, to form the lower draft, causes the air in its passage through the kiln to move along the floor and through the lower courses of the lumber. To further facilitate this movement, the smaller curtains *h* are also hung from the ceiling at intervals of about twelve feet, extending about eighteen inches down to and resting upon the cars of lumber, thus preventing the hot air from rushing along the ceiling and out the chimney, and forcing it by a lower draft to pass through and underneath the lumber.

Nearly over the inner edge of the opening *e*, by which the hot air is admitted to the kiln, the longer curtain *h'* is suspended, hanging free from but near the adjacent lumber-pile, as shown in the drawings. This curtain receives the hot air and directs it horizontally against the lower portion of the nearest lumber-pile. Once given a horizontal direction, and finding egress only beneath the lowered curtain or door N, with the strong draft that usually prevails through the kiln, the air has much less tendency to rise to the ceiling in its passage to the chimney. Such tendency being, however, still sufficient for the purpose, the distribution of the air and its action upon the lumber is essentially uniform throughout the height and breadth of the drying-chamber.

Having thus described my invention, I claim—

1. In a kiln for drying lumber, the steam-pipes C, arranged upon the inclined ground-floor B, and underneath the inclined floor O of the drying-chamber on which the cars run, as and for the purpose herein set forth.

2. The steam-pipes C, set up in gate form across the kiln, with free expansion-joints and headers running across and lengthwise of the kiln, substantially as and for the purpose herein set forth.

3. The broad chimney M, extending entirely across the kiln, and provided with the two chimneys M' M', separated by inclined deflecting-boards, as set forth.

4. In combination with the chimney M, having a sliding door in front, the steam-box P, arranged forward of the chimney, and provided with a hinged and a sliding door, as shown, and arranged upon the forward extension of the floor O, so as to be entirely independent of the kiln proper, substantially as and for purpose herein set forth.

5. In combination with a drying-chamber and a chimney which opens therefrom at the top and at one end of said chamber, the curtain or sliding door N, located as shown, and extending across the chamber to form a downward extension of the chimney of the full width of the drying-chamber, substantially as and for the purpose set forth.

6. In combination with the broad chimney M, kiln A, and heating-chamber underneath, the sliding door or curtain N, arranged in the mouth of the chimney, and leaving an opening at the bottom, whereby the hot air is compelled to descend to the floor of the kiln before passing out through the chimney, as set forth.

7. The combination, with the drying-chamber A, curtain N, forming a downward extension of the chimney, and the opening *e*, for the admission of the hot air from below, of the curtain *h'*, depending from the ceiling at a point nearly over the inner edge of the opening *e*, and reaching from side to side of the kiln, substantially as and for the purpose set forth.

JOHN J. CURRAN.

Witnesses:
M. E. DAYTON,
JESSE COX, JR.